(12) United States Patent
Pellenc

(10) Patent No.: US 9,574,725 B2
(45) Date of Patent: Feb. 21, 2017

(54) SMART PORTABLE LIGHTING DEVICE

(71) Applicant: Roger Pellenc, Pertuis (FR)

(72) Inventor: Roger Pellenc, Pertuis (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 268 days.

(21) Appl. No.: 14/377,074

(22) PCT Filed: Feb. 20, 2013

(86) PCT No.: PCT/FR2013/050349
§ 371 (c)(1),
(2) Date: Sep. 30, 2014

(87) PCT Pub. No.: WO2013/128098
PCT Pub. Date: Sep. 6, 2013

(65) Prior Publication Data
US 2015/0077967 A1    Mar. 19, 2015

(51) Int. Cl.
*F21V 19/04*    (2006.01)
*F21L 4/00*    (2006.01)
(Continued)

(52) U.S. Cl.
CPC .. *F21L 4/00* (2013.01); *F21L 2/00* (2013.01); *F21S 8/085* (2013.01); *F21V 23/007* (2013.01);
(Continued)

(58) Field of Classification Search
CPC .... H05B 33/0854; H05B 37/0227; F21L 4/00; F21L 2/00
See application file for complete search history.

(56) References Cited

U.S. PATENT DOCUMENTS 4,410,835 A * 10/1983 Zabroski ............... H05B 39/10
307/66
4,890,093 A    12/1989 Allison et al.
(Continued)

FOREIGN PATENT DOCUMENTS

GB    2476466 A    6/2011
WO    2010057138 A2    5/2010

OTHER PUBLICATIONS

International Search Report for corresponding International Application No. PCT/FR2013/050349.

*Primary Examiner* — Evan Dzierzynski
(74) *Attorney, Agent, or Firm* — Egbert Law Offices, PLLC

(57) ABSTRACT

A smart portable lighting device including: at least one or a plurality artificial light sources having a high light output, the artificial light source or each of the artificial light sources being provided with an voltage-to-current electricity converter, which is capable of modulating the output of the light sources according to a given set value; a self-contained power source having a rechargeable battery for supplying electricity to the artificial light source(s) via the voltage-to-current electricity converters, characterized in that the device includes an electronic management casing, which includes a digital processing unit with attached circuits to which the converter(s) of the light source(s) and the self-contained power source are connected, the electronic management casing being configured so as to establish the main lighting phase by programming the desired lighting duration determining a constant light output, or by programming a constant light output determining the available lighting duration.

20 Claims, 5 Drawing Sheets

(51) Int. Cl.
*H05B 33/08* (2006.01)
*H05B 37/02* (2006.01)
*F21L 2/00* (2006.01)
*F21S 8/08* (2006.01)
*F21V 23/00* (2015.01)

(52) U.S. Cl.
CPC ...... *H05B 33/0842* (2013.01); *H05B 33/0854* (2013.01); *H05B 37/0227* (2013.01); *Y02B 20/48* (2013.01)

(56) References Cited

U.S. PATENT DOCUMENTS

| | | |
|---|---|---|
| 2005/0007304 A1 | 1/2005 | Gallagher et al. |
| 2009/0058680 A1 | 3/2009 | Benn |
| 2009/0079398 A1 | 3/2009 | Saar |
| 2010/0027085 A1* | 2/2010 | Catalano ............... F21L 14/023 359/15 |
| 2011/0156926 A1 | 6/2011 | Chen et al. |
| 2011/0176289 A1* | 7/2011 | Ramer ...................... F21K 9/56 362/84 |
| 2011/0298393 A1* | 12/2011 | Chew ................. H05B 33/0821 315/294 |

* cited by examiner

SMART PORTABLE LIGHTING DEVICE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns a smart portable lighting device.

It applies in particular, to a smart portable lighting device that is lightweight, powerful and durable, designed to be immediately operational without any maintenance even in cases of prolonged non-utilization, ready to be connected to the electric power grid or having its own electric power source in the form of rechargeable batteries, and capable of illuminating, depending on the users' requirements, large areas of diverse activities, during various operations such as security or rescue interventions (for example interventions by emergency personnel on accident sites, rescue operations for persons involved in natural disasters making all classic routine communications impossible), or for work requiring good lighting that is self-contained and constantly available for at least several hours, in case of a breakdown of the power grid or if it impossible to gain access to said power grid.

2. Description of Related Art Including Information Disclosed Under 37 CFR 1.97 and 37 CFR 1.98.

In numerous circumstances, it is indispensable to provide temporary artificial lighting installations on diverse intervention sites, so as to obtain lighting for action scenes, so that the intervening personnel may be able to accomplish the tasks requiring good vision of the environment, so they can operate under the best conditions of visibility possible.

Public authorities sometimes make such equipment mandatory which must be available at any moment and be put in operation very rapidly, depending on the cataclysmal circumstances, and this even if this equipment has been stored over long periods with oftentimes non-existing maintenance during those periods.

These temporary electric lighting installations are transported to the sites of utilization, for example on light vehicles or pack animals, but it is advantageous to be able to have them easily carried by a single person with minor drudgery in cases where circumstances are such that cataclysms preclude the utilization of other means to quickly bring powerful and long-lasting light sources to disaster sites.

To meet the afore-mentioned needs, and especially on public works sites, self-contained, portable lighting installations are routinely used which use various sources of energy and consist of:
  Gas lighting devices, operating with gas bottles;
  Electric lighting devices consisting of conventional projectors powered by electric generators;
  Electric lighting devices powered by lead batteries using discharge lamps, for example Xenon lamps.

The major disadvantages of these lighting devices are as follows:
  They are heavy and cumbersome and cannot easily be carried by a single person, so that several persons are needed for carrying a portion of this lighting device. Under these conditions its re-assembly on the site will take longer and it is not very advantageous to mobilize several persons for a single device;
  Most of them consume fossil fuels in significant quantities which continue to be more and more costly and for which storage conditions become more and more strict and regulated;
  They poorly support prolonged storage periods of non-utilization, so that they often require maintenance operations just when they are needed, making their availability unreliable and most of the time not instant;
  Their light output is not or only slightly adjustable, thereby limiting, when in self-contained use, the possibility to prolong the lighting duration by reducing the light output;
  The lighting duration and more precisely the remaining light duration is unknown or modifiable when the energy source is limited in self-containing utilization;
  When the power source is self-contained and nearly exhausted, light output diminishes rapidly and uncontrollably, and can create grave situations in case of total darkness of the area while critical operations are still on-going in said area. The remaining lighting duration determined as of the moment when lighting diminishes does not allow alerting the users sufficiently early to that they can proceed with securing the area before complete extinction of lighting;
  They do not offer any or only very little possibility to be connected to another power source, for example the power grid when this is available, and in any case do not offer the possibility of changing the power source instantly and automatically when the major power source becomes suddenly unavailable.

Only the use of a number of lighting systems would minimize the risk of a sudden lack of light in the area in question and/or of having to face insufficient durations of lighting for completing the works or interventions in progress. This is perfectly conceivable on specific and planned sites, but cannot be envisaged for disaster situations where availability of several systems in a single intervention area may be impossible to provide at the scale of several hours or even several days.

Also known are lightweight self-containing lighting devices consisting of LED hand lamps for single hand use and powered by rechargeable or not rechargeable batteries providing relatively strong lighting. But these systems have limited operating capabilities due to the weight of the battery for being carried by hand Most of the disadvantages mentioned are therefore found in the state of the art described above.

Such a system is shown schematically in FIG. 1 illustrating the present state of the art and according to which the energy source consisting here of a rechargeable battery is directly connected to the light sources through voltage-to-current converters of electric energy capable of adapting the voltage/current characteristics of the rechargeable battery to the operating specificities in voltage and/or current of the light sources. But there is, in this case, no possibility of smart management of the lighting, especially with respect to the duration of the lighting.

It is known that light sources such as LED lamps have, among others, three major advantages:
  Very significant light output (capable today of outputs above 100 lumen/Watt), identical to or even above those of Xenon lamps or other discharge lamps;
  Low voltage operation;
  Capability of modulating the luminous intensity through voltage-to-current converters of electric energy which are known as such, directly connected to the energy source, intended to deliver the voltage/current characteristics required for supplying power to the light source and appropriate for performing a task (between 0 and 100% for example), allowing to modulate this luminous intensity, which is all but impossible to obtain with discharge lamps.

The applicant has, incidentally, developed a whole range of high energy rechargeable batteries for professional use, together with a range of distinct portable electric tools, each possessing its own operating characteristics, a system described for example in document FR-2.920.683.

Document GB 2 476 466 describes a battery management device for a portable lighting apparatus.

The battery control device described in this document:
  does not feature an electronic management housing to which are connected both the battery and also one or even several light sources;
  does not feature a device that is configured to establish, while the system is in operation, a main lighting phase by programming the desired lighting duration, determining a constant lighting output;
  does also not allow programming a constant lighting output determining the available lighting duration.

Overall, the purpose of the device described in this document is also to manage the end of useful life of the battery, a well-known solution. For example, in the case of selecting a lighting time where the user wants to ensure a constant light output, the battery will not necessarily be at the end of its useful life at the end of this time, even while providing the maximal output of the lamps during this period.

The device described in the GB 2 476 466 document limits itself in effect to adapting the light output of the LEDs depending on the end of the charge of the battery, in order to preserve the overall assembly. One finds oneself in the typical and familiar case of a flash light the brightness of which declines towards the end of the charge of its battery, with the user having no control over this duration. The system described in this document makes the light source communicate in this sense, integrating a smart energy conversion system, and a battery integrating also its own smart system. One is dealing here with a somewhat sophisticated flash light which will only alert the user at the end of the discharge of the battery, without the user being able to know the duration separating him from the next alarm point.

The system according to GB 2 476 466 does not feature intermediary electronic management housing capable of managing, and thus communicating to the user, the lighting duration remaining or to modulate a constant output depending on the duration desired by the user, guaranteeing him a constant brightness during this time.

Document WO-2010/057138 discloses an energy saving system comprising at least one light source powered by solar panels and/or batteries. According to this document, this system actively manages the available energy and controls the output or energy delivered to the load so as to enable said light sources and/or other devices to function efficiently and to supply the users even on days, weeks or months of weak solar luminosity.

The preferred adaptations actively manage the battery charge and actively manage the output delivered to the load, in contrast to the conventional control methods where the system is passively controlled by the load. Thus, the preferred implementations prevent the system batteries from discharging below their low operating threshold, even when operating during prolonged periods of weak sunshine, whereas the conventional methods of control let the load use more energy than is available in the storage of the system/battery and frequently results in the disconnection (shut-off) of the load and damages the battery.

On the other hand, the device described in WO-2010/057138 document proposes to manage a network of electric consumers (street lights, traffic lights, WiFi terminals, . . . ) using energy sources such as solar panels and rechargeable batteries, by managing the outputs delivered according to a predictive mechanism depending on phenomena such as ambient brightness, the seasonal day/night effects or the climatic conditions on the basis of mathematical models established according to meteorological histories.

Document WO-2010/057.138 therefore does not describe a portable lighting system, but one could consider that it features an electronic management casing featuring a smart system concerned with modulating the energy sources in order to ensure the priorities even of the minimum energy supplies to the different consumers according to a predictive model. This smart system does not seek to guarantee a constant lighting output, for example during a given length of time, because it depends on the other consumers of the network and the meteorological conditions. This system seeks instead, as does the one described in the GB 2 476 466 document, to protect the battery from overloads and overdischarges which can lead to its rapid degradation over time. This is a stationary application where the characteristics of the battery are calculated with wide safety margins in order to ensure its functioning over several years while taking basic predictive models into account.

BRIEF SUMMARY OF THE INVENTION

The subject of the invention is to offer a solution for the disadvantages of prior art mentioned above by proposing a smart, powerful, and durable, portable lighting device that can be carried by a single person, this device can be easily and rapidly installed on intervention sites and provided with an electronic management casing for managing, in self-containing energy mode, the remaining duration of the main lighting phase, depending on the installed lighting output, without degradation of the desired lighting in the intervention area and to ensure, following said main lighting phase, a safety lighting phase of predetermined duration, when the energy source is nearing depletion, ensuring progressive degradation or not of the lighting output for a determinate time, so as to alert the users of the range of action and to give them the necessary time for securing said area prior to complete extinction of the lighting.

According to the invention, this aim has been achieved by a smart portable lighting device comprising:

at least one source of artificial light with a high luminous output, for example constituted by a LED projector, or preferably and advantageously, several sources of artificial light, this source of artificial light, or each of these sources of artificial light being equipped, in a manner known per se, with a voltage-to-current electricity converter capable of modulating the output of said light sources in accordance with a given set value;

a self-containing source of electricity preferably constituted by at least one rechargeable battery to provide electricity to the source or sources of artificial light through voltage-to-current electricity converters; this device being remarkable in that it furthermore includes an electronic management casing comprising at least one data-processing unit such as for example a microprocessor, or a microcontroller or a digital signal processor, associated with additional circuits, and to which the converter(s) of electric energy of the light source(s) are connected, and the self-containing source of electric energy which powers more particularly said electronic management casing, the latter being configured to establish, during operation of the device, a main phase of lighting by programming the desired lighting duration determining a constant lighting output, or by programming a constant lighting output determining the available lighting duration.

According to one implementation, the electronic management casing is configured to:

communicate with the self-containing electric power source in order to acquire at least information about its instant residual capacity and/or to measure the voltage and/or current characteristics of said self-containing electric power source to determine the residual energy of said self-containing electric power source;

determine the number of light sources comprised in the device, by measuring the current for a given set value of lighting output;

establish the set value of lighting output transmitted to the voltage-to-current converter(s) of electric energy depending on the residual energy of the self-containing electric power source, the number of light sources to power and the desired duration of the main lighting phase, or determine, periodically or continuously, the available lighting duration depending on the residual energy of the power source, or the number of light sources to be powered and the desired lighting output of the main lighting phase.

According to another implementation, the electronic management casing is configured to ensure, at the expiration of the main lighting phase, a safety lighting phase defined by a predetermined duration during which the set value for lighting output transmitted to the voltage-to-current converters of electric energy is degraded, in linear fashion or not, to guarantee a minimal lighting output during the entire safety lighting phase.

According to another implementation, the electronic management casing is configured to allow readjusting the lighting output set value of the light sources, depending on the modifications by the user of the desired lighting duration or to readjust, periodically or continuously, the available lighting duration depending on the modifications by the user of the desired lighting output set value, during the main lighting phase.

According to another characteristic disposition, the electronic management casing is configured to enable, at the expiration of the safety lighting phase, very weak lighting until the total extinction of said device.

According to an advantageous implementation, the lighting device features means of connection to the alternative power distribution network or power grid, for supplying the source(s) of artificial light, and the electronic management casing is configured to detect accidental power failures of said power grid and to switch instantaneously to the self-containing power supply for the light sources of the sector.

According to a preferred implementation, the lighting device comprises a measuring system for the amount of energy remaining in the battery.

According to an advantageous implementation, the electronic management casing is configured to receive one or several brightness detectors integrated into the casing or maintained outside of it, allowing guiding guide the lighting output set value depending on the desired lighting at the detector, or the average of illuminations measured by a number of detectors.

According to another implementation, the electronic management casing is configured to detect the presence or absence of persons in the intervention area by means of one or several detectors integrated into the casing or maintained outside of it, said electronic management casing having then the capacity to reduce the lighting of the area when no motion is detected and to return to the initial lighting when a presence is again detected. This has the interesting advantage of being able to save energy in self-containing mode or otherwise.

According to an advantageous implementation, the electronic management casing is configured to warn persons present in the intervention area of the degraded lighting phase by acoustic or visual signals.

According to one implementation, the lighting device comprises also a battery charger that can be integrated into the electronic management casing and charging the battery when the casing is connected to the power grid.

According to another implementation, the lighting device comprises also an indicator to show the operating parameters of the device, for example, the level of the set value of lighting, brightness and remaining duration of use for the main and safety lighting phases.

According to another implementation, the self-containing source of electric energy is equipped with a recognition system of the electric characteristics of the smart lighting function, of voltage and current, allowing said self-containing source of electric energy to take into account these characteristics in order to ensure the safety of said self-containing electric power source.

According to another characteristic arrangement, the portable lighting device is realized in the form of one or several lighting units, this lighting unit or each of the lighting units featuring at least two projectors connected in series, the electronic management casing being connected, on the one hand, to one of the projectors and, on the other hand, to the power source. According to one implementation, the projectors of each lighting unit, constituted by the lamps integrating the light sources, are installed in the upper part of a street light or lamp post comprising a pole supported by a mounting base.

According to another implementation, the lighting device comprises at least one projector formed so it can be handheld and directed by the user, the electronic management casing being connected, on the one hand, to said projector and, on the other hand, to the self-containing electric power source, said casing and said self-containing electric power source being portable by the user by use of a belt or harness, so that the lighting device thus obtained constitutes a smart electric torch of significant independence.

The invention provides numerous advantages; it makes available to concerned intervening parties smart and powerful lighting which allows time management of light in complete safety and an embodiment in the form of a lightweight device (weight in the order of 10 to 15 kg if the pole is added) that is immediately available and space-saving which makes carrying it to the utilization site less tedious for a single person.

Furthermore, the electronic management casing makes possible:
- a selection of the desired lighting duration during the main lighting phase resulting in the calculation, by the electronic management casing, of the set value of lighting output of all projectors connected in series, in order to maintain this output for the selected duration while taking into account the number of projectors connected and the residual energy contained in the power source(s);
- a selection of the desired lighting output resulting in the calculation, by the electronic management casing, of the available length of lighting for the main lighting phase, as well as of the set value of lighting output of all projectors connected in series, while taking into account the number of projectors and the residual energy contained in the power source(s);
- the definition of a safety lighting phase based on the parameters defining the main lighting phase, triggered at the end of the duration of the main lighting phase and defined by a predetermined duration resulting in the degradation by the electronic management casing of the set value of lighting output transmitted to the power converters of the light sources according to a pre-defined model or progressively, or in stages, or draw-downs, so as to guarantee, during this period, a minimal light output that is also predefined, allowing the personnel present in the intervention zone to take the necessary measures and to avoid an abrupt loss of lighting;
- a final phase, triggered at the end of the safety lighting phase, occurring only in case of prior inactivity of the user on the final extinction of the device by means of a run/stop device, for indefinite duration, but of a predetermined very dim lighting output, ending in the depletion of energy available from the power source;
- a warning to the users intervening during the entire safety lighting phase, in the form of acoustic and/or visual signals;
- a mode of lighting management depending on the presence or absence of persons in the intervention area, determined by presence detector(s);
- a mode of lighting management depending on the brightness recorded by the brightness detector(s) which can be attached to the lighting units or one of the lighting units, or maintained separately at a reference site of the intervention area;
- a limitation of the number of projectors, for example powered by a by-pass system at each projector;
- management of the battery charge when the lighting device is connected to the power grid.

BRIEF DESCRIPTION OF THE DRAWINGS

The aforementioned aims, characteristics and advantages and still more will become clearer from the following description and the attached drawings in which.

Reference is made to said drawings to describe interesting, although by no means limiting, examples of embodiment of the smart portable lighting device according to the invention.

DETAILED DESCRIPTION OF THE INVENTION

The portable lighting device according to the invention comprises:
- at least one artificial light source of high light output A, for example constituted by a LED projector, or preferably and advantageously, several artificial light sources 1A, 1B, for example two artificial light sources, each equipped, in a manner known per se, with a voltage/current electricity converter C1A, C1B, capable of modulating the output of said light sources according to a given set value;
- a self-containing source of electricity 2, constituted by one or several rechargeable batteries, for supplying electric power to the artificial light source(s) 1A, 1B via the voltage-to-current electricity converters C1A, C1B;
- an electronic management casing 4, connected, on the one hand, to the self-containing electric power source 2 and, on the other hand, to at least one artificial light source 1A, 1B, and to which are connected the converter(s) of the light source(s) C1A, C1B, and the self-containing electric power source 2; this electronic management casing comprising at least one digital processing unit, such as a microprocessor, or micro-controller, or digital signal processor, combined with attached circuits, capable and configured to establish, during the operation of the device, a main lighting phase by programming the desired lighting duration T1, determining a constant lighting output P1, or by programming a constant light output P1 determining the available lighting duration T1.

According to one implementation, the electronic management casing 4 is furthermore configured to:
- communicate with the self-containing electric power source 2 to acquire at least information about its instant residual capacity and/or measure the voltage and/or current characteristics of said self-containing electric power source to determine the residual energy of the latter;
- determine the number of light sources (1A, 1B, ...) comprised in the device, by a measure of the current for a set value of light output and a nominal output of the given light sources;

establish, for the main lighting phase, depending on the number of connected projectors and the residual energy of the self-containing electric power source 2, the set value of light output transmitted to the voltage-to-current electricity converters to end in the lighting output P1 during the desired duration T1, or determine the available lighting duration T1, if the user wants to define the lighting output at the value P1.

Figure 8:
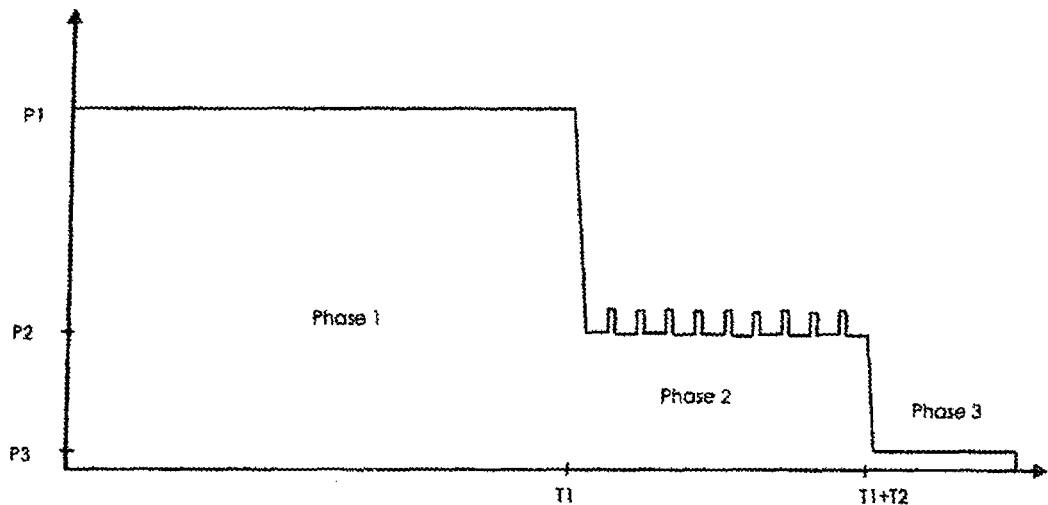
FIGS. 8 and 9 are views illustrating management examples of the lighting device in the form of diagrams showing the evolution of the lighting output depending on the available durations.
Figure 9:
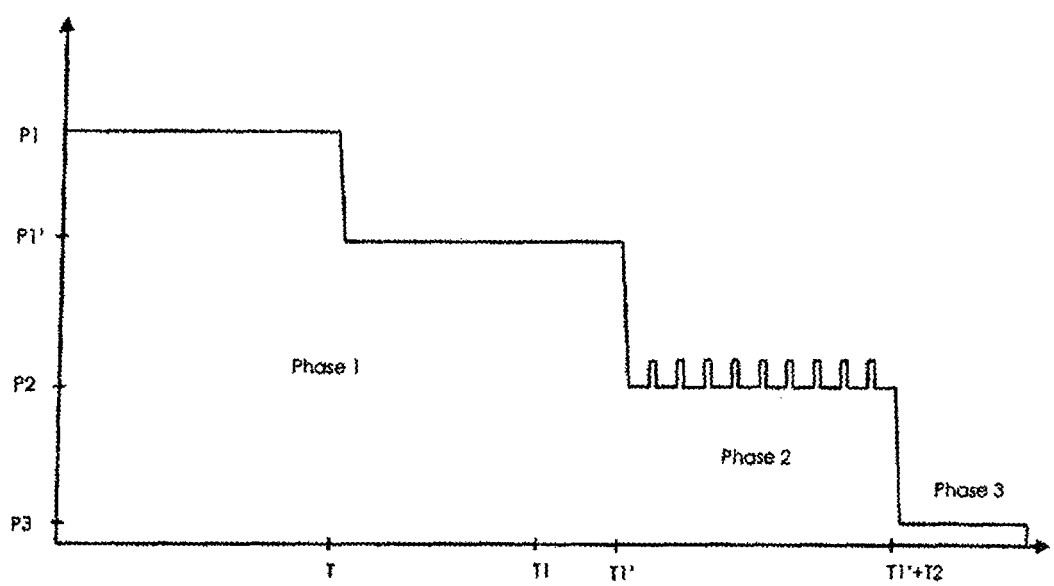

According to another advantageous implementation, the electronic management casing is configured to ensure, at the end of the main lighting phase T1, a safety lighting phase defined by a predetermined duration T2 during which the set value of lighting output transmitted to the voltage-to-current converters of electricity has been degraded in linear fashion or not, for example in drawn-down form as illustrated in the examples of FIGS. 8 and 9, while guaranteeing a minimal lighting output P2 for the entire duration.

According to the example illustrated in FIG. 8, the user determines a set value of duration T1 which he needs to perform his work in the intervention zone, and the electronic management casing allocates to him an output P1 for the entire duration T1 of the main lighting phase, or phase 1.

Respectively, the user can also determine a set value of lighting output corresponding to the lighting output P1 which he needs to perform his work in the intervention zone, and the electronic management casing indicates to him the available duration T1 corresponding to the main lighting phase.

According to an advantageous implementation, the electronic management casing 4 is configured so as to allow readjusting the set value of lighting output of the light sources, depending on the modifications of the desired lighting duration or to readjust the available lighting duration depending on the modifications of the set value of desired lighting output, during the main lighting phase.

Thus, as illustrated in FIG. 9, the user can intervene at any time (here at the end of a time T) on the lighting device, during the main lighting phase, to modify either the set value of duration, from T1 to T1', thus allowing the electronic management casing to establish P1', or the set value of output from P1 to P1', thereby allowing the electronic management casing to recalculate the available lighting duration, here T1':
  in the case where the user modifies the set value of duration, for example by indicating a duration T1' that is above the initially determined duration T1, the management casing readjusts the available lighting output by attributing an output P1' below P1, the initially allocated output;
  likewise, in the case where the user modifies the set value of output, for example by indicating an output P1' below the initially determined output P1, the management casing readjusts the duration of available lighting by attributing a duration T1' above T1, the initially allocated duration.

At the expiration of the main lighting phase T1, or T1' in case of readjustment, the electronic management casing triggers the degraded lighting phase (or phase 2 on FIGS. 8 and 9) corresponding to a safety duration T2 during which the user is assured of having a minimal output lighting P2 corresponding to the degraded lighting phase.

This duration T2 and this output P2 are parameters which are configured by default in this particular implementation, but they can also be determined beforehand by the user with a specific version of the software integrated in the electronic management casing.

According to another characteristic disposition, the electronic management casing is configured to allow, at the end of the degraded lighting phase (phase 2), an ultimate phase of safety lighting with very low lighting output P3 of undetermined length (phase 3 on FIGS. 8 and 9) and preceding the total extinction of said device. This total extinction will then occur at the complete depletion of energy of the self-containing electric power source 2.

The light sources 1A, 1B are advantageously constituted by projectors of high brightness, low electric power consumption and suitable for modulation of their light output, such as LED projectors. These projectors, for example constituted by street lamps or lanterns, comprise interchangeable LED modules capable of emitting luminous flux of high output, for example in the order of 14,000 lumen or more.

The self-containing electric power source is constituted by a rechargeable battery or batteries (2), in particular and advantageously by lithium-ion or lithium-polymer batteries.

Advantageously, the self-containing electric power source 2 is provided with a recognition system of the electric characteristics of the smart lighting function, of voltage and current, enabling said self-containing electric power source to take these characteristics into account to ensure the safety of said self-containing electric power source.

The electronic management casing 4 is also configured to:
  measure the lighting output of the light sources depending on the information transmitted by the brightness detector(s);
  define the lighting output of the light sources;
  establish the set value of light output towards the voltage-to-current converter(s) of electric energy (C1A, C1B, ... ) enabling them to modulate the output of the light source(s) (1A, 1B, ... ) by limiting the consumption of electric energy coming from the self-containing electric power source 2.

According to another implementation, the electronic management casing is configured to define the remaining lighting duration in the main phase, depending on the defined requirements for lighting.

According to another implementation, the electronic management casing 4 is configured to define the remaining duration of lighting in the degraded phase when the electronic management casing determines that the power source is close to depletion.

According to an advantageous implementation, the electronic management casing is configured to warn the persons present in the intervention zone of the degraded lighting phase. This warning feature can be constituted for example simply by a reduction of the lighting output P2 at the beginning of the degraded lighting phase, or the user can determine the operating modalities of the lighting of the degraded phase to have a set value of output P2 and hence a lighting in serrated shape (see FIGS. 8 and 9).

According to another implementation, this warning feature can be constituted by an acoustic alarm and/or a signaling light integrated into the electronic management casing.

According to an advantageous implementation, the lighting device features connectors to the electric distribution network or grid, for powering the artificial light source(s) and the electronic management casing is configured for switching, instantly for example, the power supply of the light sources from the grid to the battery in case of an accidental power failure, when the lighting device according to the invention is powered by the latter.

The different components of the electronic management casing may or may not be integrated in one single casing. This casing is advantageously made of a material that is a good heat conductor, for example aluminum, so the heat generated in particular by the charger can be dissipated.

The electronic management casing furthermore integrates:
- means for starting/stopping the device, for example an ON/OFF button;
- means for adjusting the desired lighting duration, for example +/− keys;
- means for display, for example an indicator, to inform the user of the major operating parameters of the device, for example of the level of the lighting set value, the number of hours and/or minutes available in the lighting phase in progress, the brightness measured by brightness detectors, depending on the number of projectors, the level of lighting and the amount of energy available in the batteries.

The electronic management casing 4 is connected to one of the projectors of the device by a cable 14 for providing power to said projector.

In a manner known per se, the set values can be generated towards the voltage-to-current converters of electric energy by a continuously evolving signal for example between the values 0 and 1, with 0 defining the extinction (or 0% of the lighting output) and 1 defining 100% of the lighting output. This set value can then be exploited at the light sources by a PWM (pulse width modulation) power supply.

It should be remembered that, in a manner known per se, the set values of lighting output transmitted to the voltage-to-current converters of energy can be transmitted:
- in digital mode, for example in PWM mode as mentioned above where the electronic management casing, for a given percentage of lighting output (for example 25%) generates, at a frequency higher than the retinal retentivity of the human eye, command sequences where the light source will have to be lit at full output first of all during the percentage of time of this sequence corresponding to the percentage of the set value of output (25% in the chosen example), then extinguished for the rest of the time (75% in the chosen example);
- and/or in analog mode: in this case, the electronic management casing generates a constant voltage signal for a given percentage of lighting output comprised between a low level (for example 0 Volt) and a high level (for example 5 Volt) where the percentage of the set value of lighting output will correspond to the low level voltage value added to the percentage of the voltage difference between the high level and the low level (in our example, one would have, for a desired lighting output of 25%, a set value of voltage transmitted to the converters of 1.25 Volt).

The connecting means 3 to the electric distribution network for the power supply to the light source(s) 1A, 1B are constituted by a cable provided with a connector known per se.

According to an advantageous implementation, the electronic management casing 4 is configured to receive one or several brightness detectors that are integrated in the casing or out-of-line for guiding the set value of lighting output depending on the desired lighting at the detector, or of the average of lighting outputs measured by a plurality of detectors and thus to adapt the lighting of the projectors 1A, 1B to the natural exterior light.

According to another advantageous characteristic disposition, the portable lighting system of the invention comprises a battery charger 6, known per se, and connecting means 7 for connecting it to the rechargeable battery or batteries 2 and to the power grid, respectively, for recharging the battery or batteries 2, when the power grid is available on the intervention site.

When the lighting device is connected to the power grid, the rechargeable batteries constituting the self-containing electric power source 2 connected to the charger 6 are charged and manage themselves. If a power failure occurs, the electronic management casing 4 automatically interrupts the electric link of the light sources 1A, 1B to the network S and connects said light sources to said self-containing electric power source.

The rechargeable batteries can also be recharged by photovoltaic modules.

According to a preferred implementation, the lighting device according to the invention comprises one or more presence detectors for detecting the presence or absence of persons in the intervention area, so as to adapt the lighting output to the presence or not of persons in said intervention area. These detectors can be integrated in the casing or be out-of-line, said electronic management casing having then the capacity to reduce lighting in the area when no motion is detected and to return to the initial lighting when a presence is again detected. This has the interesting advantage of allowing energy savings whether in the self-containing mode or not.

According to another implementation, the lighting device comprises a measuring system for the amount of electric energy remaining available in the self-containing power source, this system making it possible to know, at any given moment, this remaining amount. The lighting device features, for example, a visual or acoustic warning feature, known per se, connected to the self-containing power source and which receives information from said measuring system, for example a device functioning by emitting light flashes can be provided to inform the personnel on site that the self-containing power source has only a few minutes of independent operation left to provide lighting using the electric energy generated by the latter.

Preferably the lighting system also comprises:
- a device for acquiring system controls;
- means enabling output modulation, for example constituted by a dimmer switch for increasing or reducing the brightness output;
- means for modulating the desired lighting duration.

These controls are located on the electronic management casing 4 but could also be remotely operated, for example by a remote control casing.

According to another characteristic disposition, the lighting device according to the invention is embodied in the form of one or several lighting units 10A, 10B, this lighting unit or each of these lighting units featuring at least two projectors 1A, 1B connected in series, the electronic management casing 4 being connected, on the one hand, to one of these projectors 1A and, on the other hand, to the power source 2 or 3.

Figure 1:
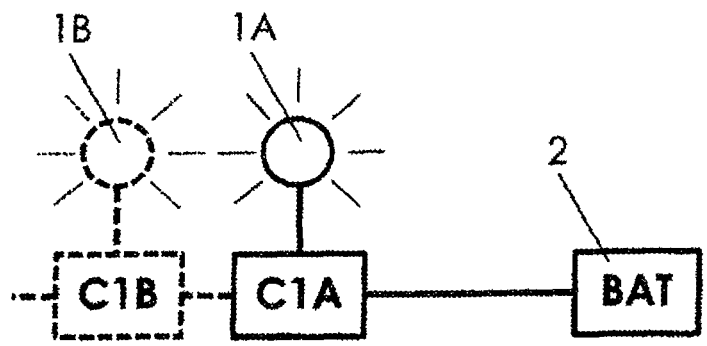
FIG. 1 is a schematic view illustrating the state of the art.
Figure 2:
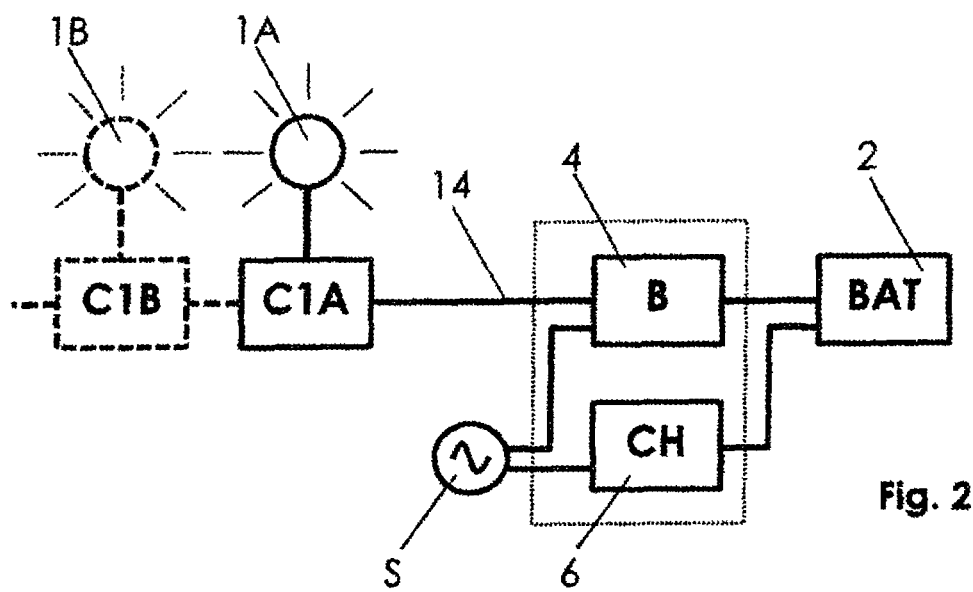
FIG. 2 is a schematic view of an example of embodiment of a lighting unit in accordance with the invention.
Figure 3:
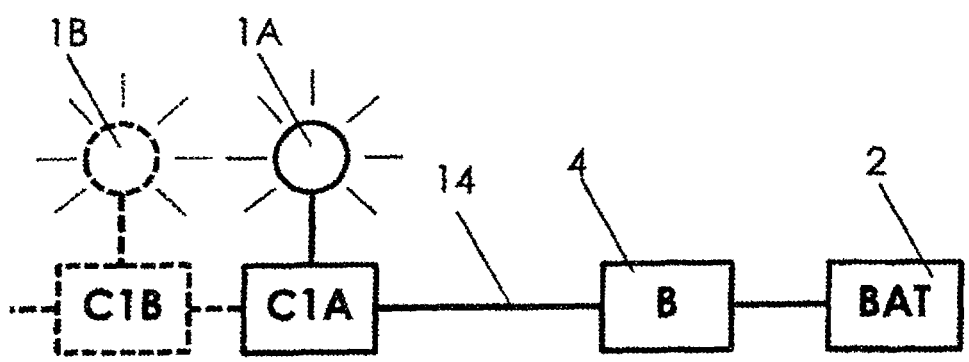
FIG. 3 is a schematic view of another example of embodiment of a lighting unit in accordance with the invention.
Figure 4:
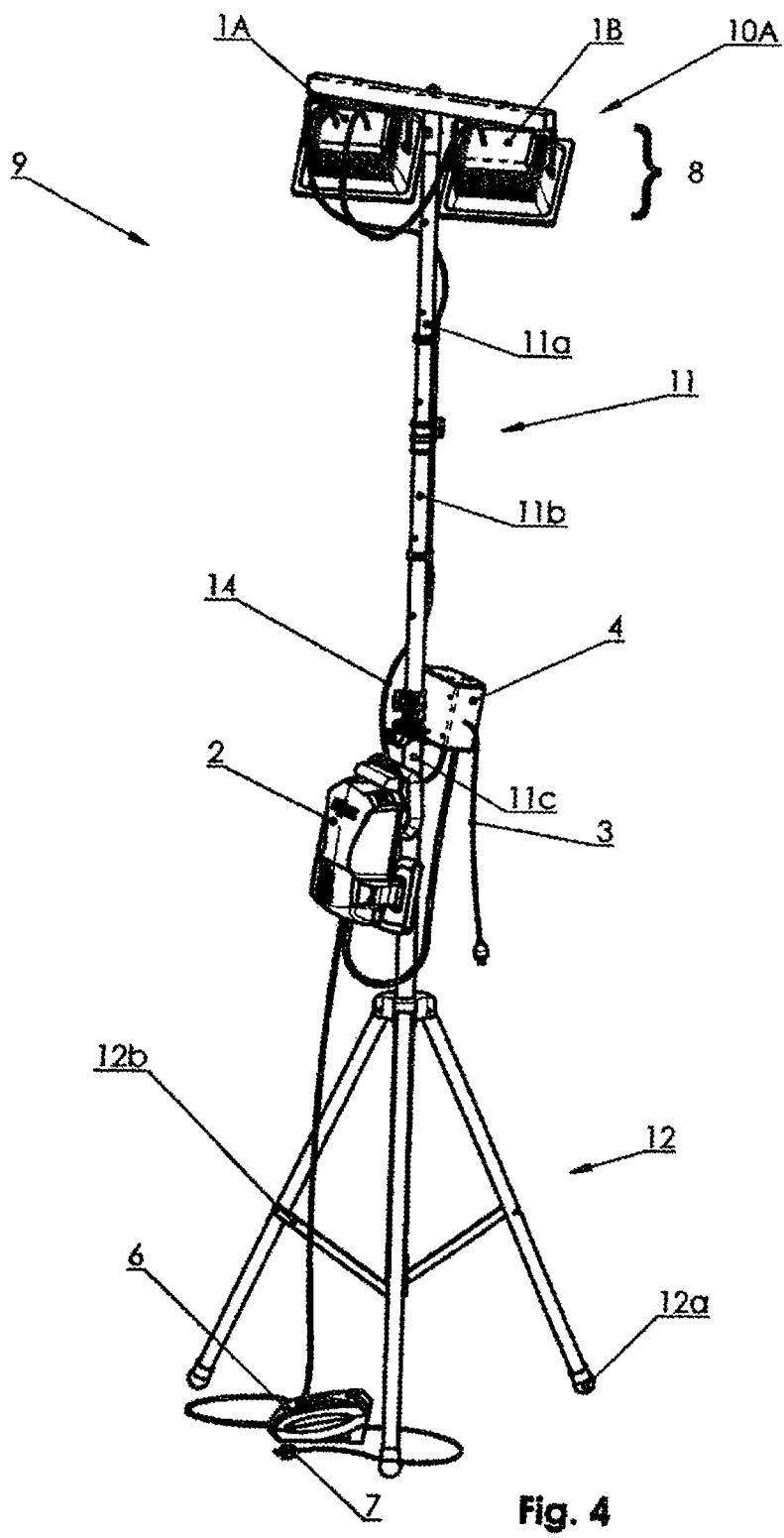
FIG. 4 is a perspective view of such a lighting unit.
Figure 5:
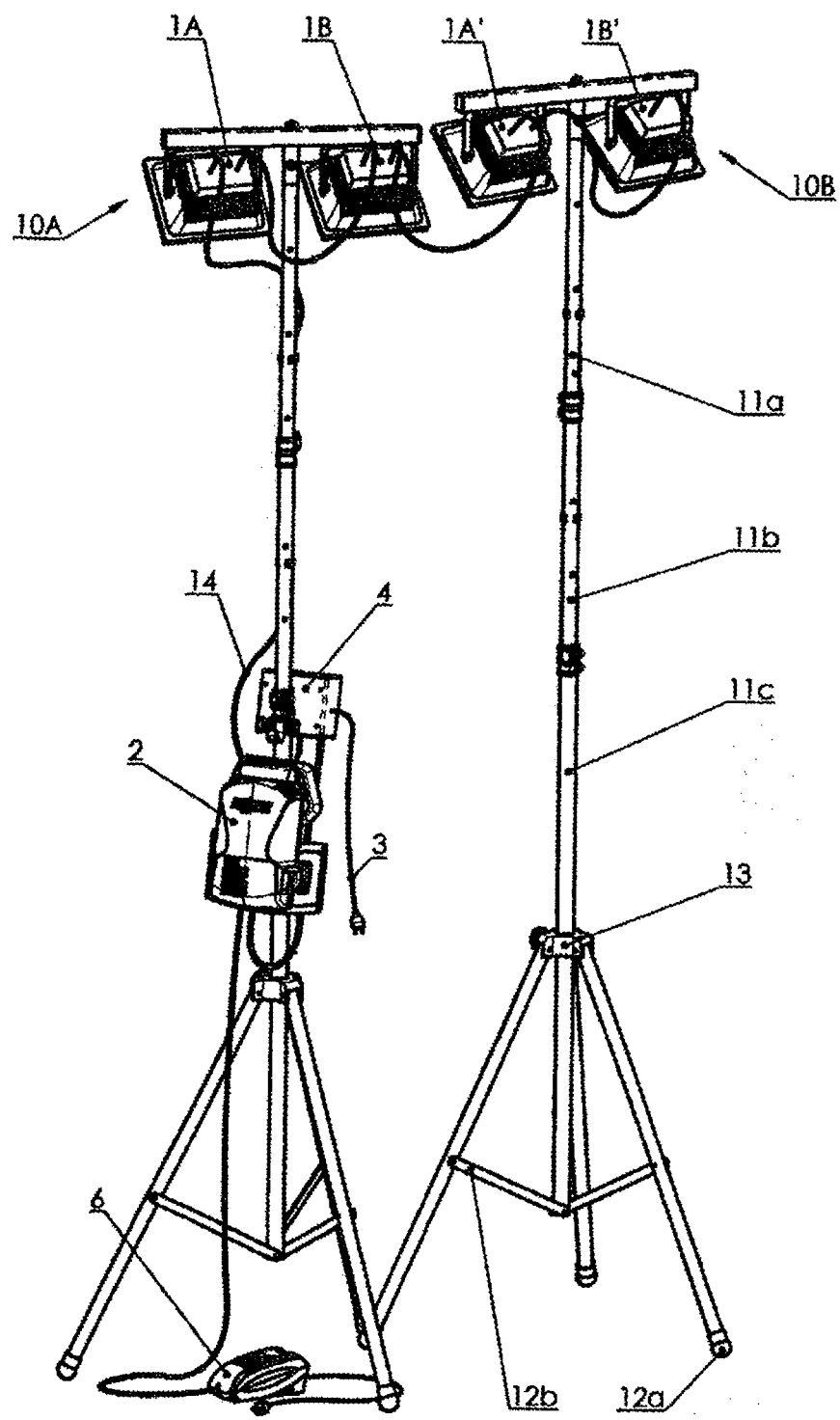
FIG. 5 is a perspective view illustrating an installation constituted by two lighting units connected in series.

According to the example shown in FIG. 5, the lighting installation comprises two lighting units 10A, 10B, each featuring two projectors 1A, 1B or 1A', 1B'. Only one of the projectors (1A) called the "master projector" of one of the lighting units (lighting unit 10A as per the attached drawing) is connected to the electronic management casing 4. The second projector (1B) of this lighting unit, called the "slave projector" is connected in series, on the one hand, to the first projector of said unit and, on the other hand, also connected in series to the other projectors 1A', 1B', also called "slave projectors" of the second lighting unit 10B. Thus, each supplementary projector added to the lighting device will be connected in series to the last projector already connected to said device.

According to one implementation, the lighting head including the projectors of each lighting unit (10A, 10B, . . . ), constituted by the lamps integrating the light sources (1A, 1B; 1A', 1B', . . . ), is installed on the upper part of a street light or lamp post 9 comprising a pole 11 supported by a base 12.

The pole 11 may be constituted by two or more than two segments, for example three segments 11a, 11b, 11c, assembled in telescopic manner and removable for easy and quick adjustment of its height, and its removal allowing it to be carried and stored at a reduced volume. In this case, the pole is equipped with locking features known per se to immobilize the segments 11a, 11b, 11c in a position corresponding to the desired height.

The lamp posts 9 present, for example, a height of 3 to 5 m, so the lighting head 8, constituted by the projectors, can be placed at a distance from the ground essentially at this height.

It must be mentioned, however, that the projectors could, in certain cases, be installed at a small distance from the ground on carrying structures of reduced height.

The base 12 may be of the articulated or foldable type, known per se, and made to occupy two possible configurations:
- a unfolded configuration where it forms a tripod the foot ends 12a of which are spaced 120° apart, the feet of this tripod are, one the one hand, interconnected by means of links 12b and articulated rods, and are attached, on the other hand, to a ring 13 positioned above the base of the pole and mounted so it can slide on the lower portion of said pole, this ring being provided with a locking mechanism (FIG. 5);
- a folded configuration, the feet being close together and positioned around the lower portion of the pole and positioned in an extension of the pole.

Figure 6:
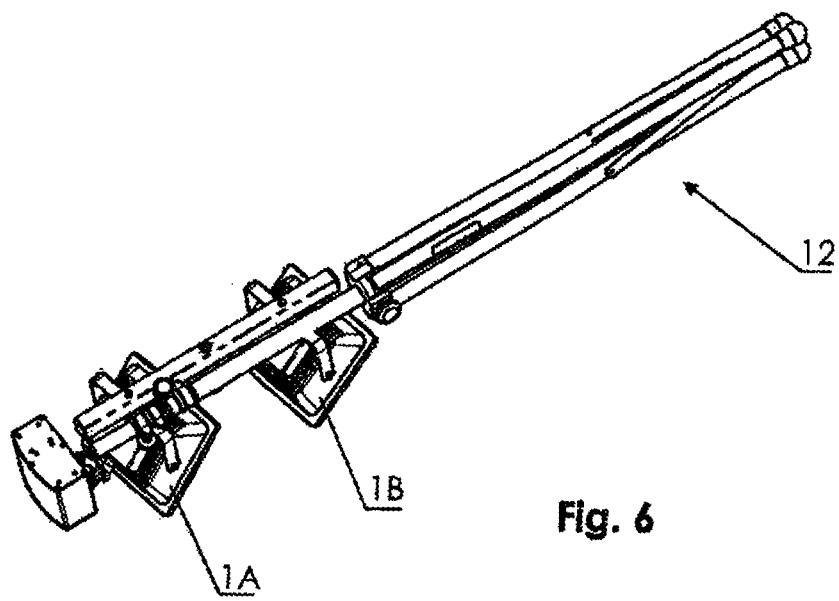
FIG. 6 is a perspective view representing an example of embodiment of the lighting device shown in the folded position.
Figure 7:
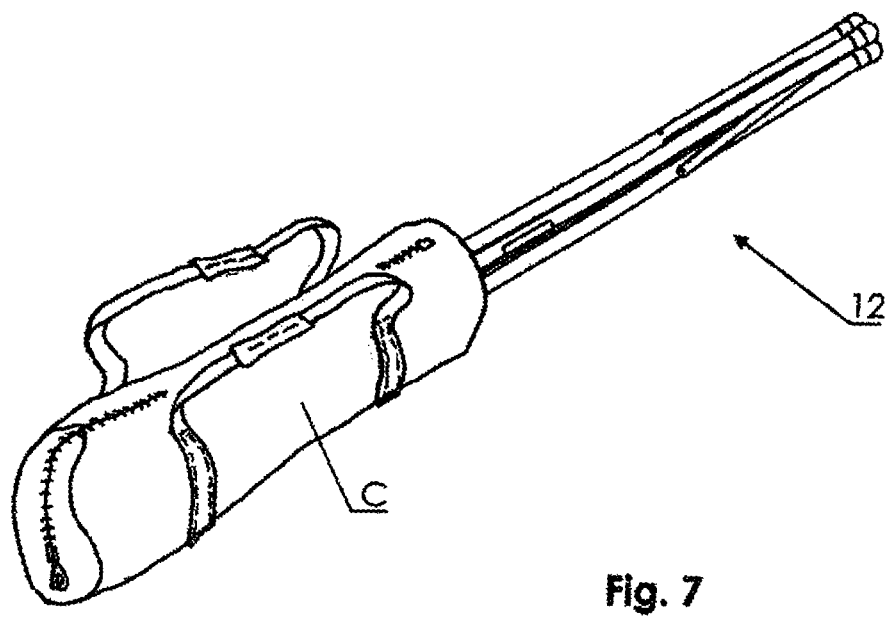
FIG. 7 is a perspective view illustrating an example of embodiment of the device in accordance with the invention, placed in a bag so it can be carried on a person's back.

Advantageously, the lighting device according to the invention, constituted by at least one light source 1A, a battery 2 and an electronic management casing 4, can be carried by a single man, once it is completely folded up (see FIGS. 6 and 7), for example the light source carried by hand in a bag C and the battery 2—electronic management casing 4 assembly carried on his back.

According to another implementation, the lighting device comprises at least one projector 1A shaped to be held and directed by the user's hand, the electronic management casing 4 being connected, on the one hand, to said projector and, on the other hand, to the self-containing power source 2, said casing and said self-containing power source can be carried by the user wearing a belt or harness, so that the lighting device thus embodied constitutes a smart and significantly self-contained electric hand lamp.

It is obvious that the smart portable lighting device according to the invention can have interesting applications in various areas of activity; for example, it can be used:
- for relief operations on accident sites;
- for rescue operations;
- for lighting work sites,
- for safety interventions performed by firemen or law enforcement personnel;
- for lighting of playgrounds etc.

The invention claimed is:

1. A portable lighting device comprising:
at least one artificial light source having a light power, the artificial light source having a voltage-to-current converter which is able to regulate the light power of the artificial light source accordingly to a given set point;
an independent electrical power source having at least one rechargeable battery so as to supply electricity to the artificial light source via the voltage-to-current converter; and
an electronic control box having at least one digital processing unit linked to auxiliary circuits that are connected to said independent electrical power source and to the voltage-to-current converter, said electronic control box communicating with said independent electrical power source to acquire information about an instantaneous residual capacity or to measure a voltage or current characteristics of said independent electrical power source to determine the residual instantaneous energy, wherein said electronic control box determines a main illumination set value having a constant illumination power from programming a desired light period, or to determine a lighting period set point from programming a constant illumination power, and wherein said electronic control box readjusts at any time a main programmed illumination set point as the user charges an illumination period or the illumination power set point during a main illumination phase, so as to establish a new lighting power set point transmitted to the voltage-to-current converter depending on residual energy of the independent electrical power source and the main programmed illumination period as soon as the user changes the illumination period set point or a new illumination period, depending on the residual energy of the independent electrical power source and the desired illumination power as soon as the user changes an illumination power set point.

2. The portable lighting device of claim 1, said electronic control box being configured to determine a number of light sources by measuring a current for a given set value of light output, and to establish the set value of light output transmitted to the voltage-to-current converter depending on the residual energy of the independent electrical power source and the number of light sources to be powered, or to determine periodically, or continuously, the lighting duration available depending on the residual energy of said independent electrical power source and the number of light sources to be powered.

3. The portable lighting device of claim 1, wherein said electronic control box is configured to ensure a safety lighting phase defined at an expiration of the main illumination phase, said safety lighting phase defined by a predetermined duration during which the set value of lighting output transmitted to the voltage-to-current converter is degraded so as to assure a minimum lighting output during an entirety of the safety lighting phase.

4. The portable lighting device of claim 3, wherein said electronic control box is configured to allow a very low lighting output at an expiration of the safety lighting phase.

5. The portable lighting device of claim 3, further comprising:
an indicator for indicating a level of the set value of lightning, a level of brightness, and a remaining utilization duration for the main illumination phase and the safety lighting phase.

6. The portable lighting device of claim 1, wherein said electronic control box is configured to allow a periodic for continuous readjusting of the set value of lighting output of the light sources depending on modifications of the desired lighting time or to readjust the available lighting duration depending on modifications of the set value of desired lighting output during the main illumination phase.

7. The portable lighting device of claim 1, further comprising:
   a means for connecting to an alternative distribution network of electricity or a grid for powering the artificial light source, said electronic control box detecting an accidental power failure of the grid and to switch the independent electrical power source from the grid to the independent electrical power source.

8. The portable lighting device of claim 1, further comprising:
   a measuring system for measuring a remaining amount of energy in the rechargeable battery.

9. The portable lighting device of claim 1, further comprising:
   at least one brightness detector connected to said electronic control box so as to guide the set value of light output depending upon a desired lighting at the brightness detector or of an average of illuminations measured by the brightness detector so as to adapt the lighting of the artificial light source to natural light.

10. The portable lighting device of claim 1, said electronic control box defining a remaining lighting duration in the main illumination phase depending upon defined lighting requirements.

11. The portable lighting device of claim 1, said electronic control box defining remaining lighting duration in a degraded phase when said electronic control box determines that the independent electrical power source is nearing depletion.

12. The portable lighting device of claim 1, further comprising:
   a presence detector integrated in said electronic control box so as to allow detection of a presence or absence of persons in an area adjacent to the presence detector, said electronic control box reducing a lighting of the area when no motion is detected and to return to the initial lighting when the presence is again detected.

13. The portable lighting device of claim 12, further comprising:
   a warning device connected to said self-contained battery and receiving information from said electronic control box, said warning device being a visual warming or an acoustic warning, said electronic control box warning a person in an area adjacent to said presence detector of the degraded phase of lighting.

14. The portable lighting device of claim 1, further comprising:
   a battery charger that is selectively connectable to the rechargeable battery in order to recharge the battery.

15. The portable lighting device of claim 1, the artificial light source being an LED projector.

16. The portable lighting device of claim 1, said independent electrical power source having a plurality of rechargeable batteries, each of said plurality of rechargeable batteries selected from the group consisting of lithium-ion batteries and lithium-polymer batteries.

17. The portable lighting device of claim 1, said independent electrical power source having a recognition system for recognizing electrical characteristics of a smart lighting function, of voltage and current.

18. The portable lighting device of claim 1 said artificial light source comprising a plurality of lighting units, said lighting unit having at least two projectors connected in series, said electronic control box being connected to one of the projectors and to the independent electrical power source.

19. The portable lighting device of claim 18, the projectors of each lighting unit being lamps installed on an upper portion of a street light or lamp post, said street lamp or lamp post comprising a pole supported by a base.

20. The portable lighting device of claim 1, the artificial light source comprising at least one projector shape to be held and directed by the hand of a user, said electronic control box being connected to said projector and to said independent electrical power source, said electronic control box and said independent electrical power source being able to be carried by the user with a belt or harness.

* * * * *